Nov. 9, 1926.  
C. A. LAWSON  
1,606,251  
HAY RAKE AND STACKER ATTACHMENT FOR TRACTORS  
Filed April 5, 1926     3 Sheets-Sheet 1
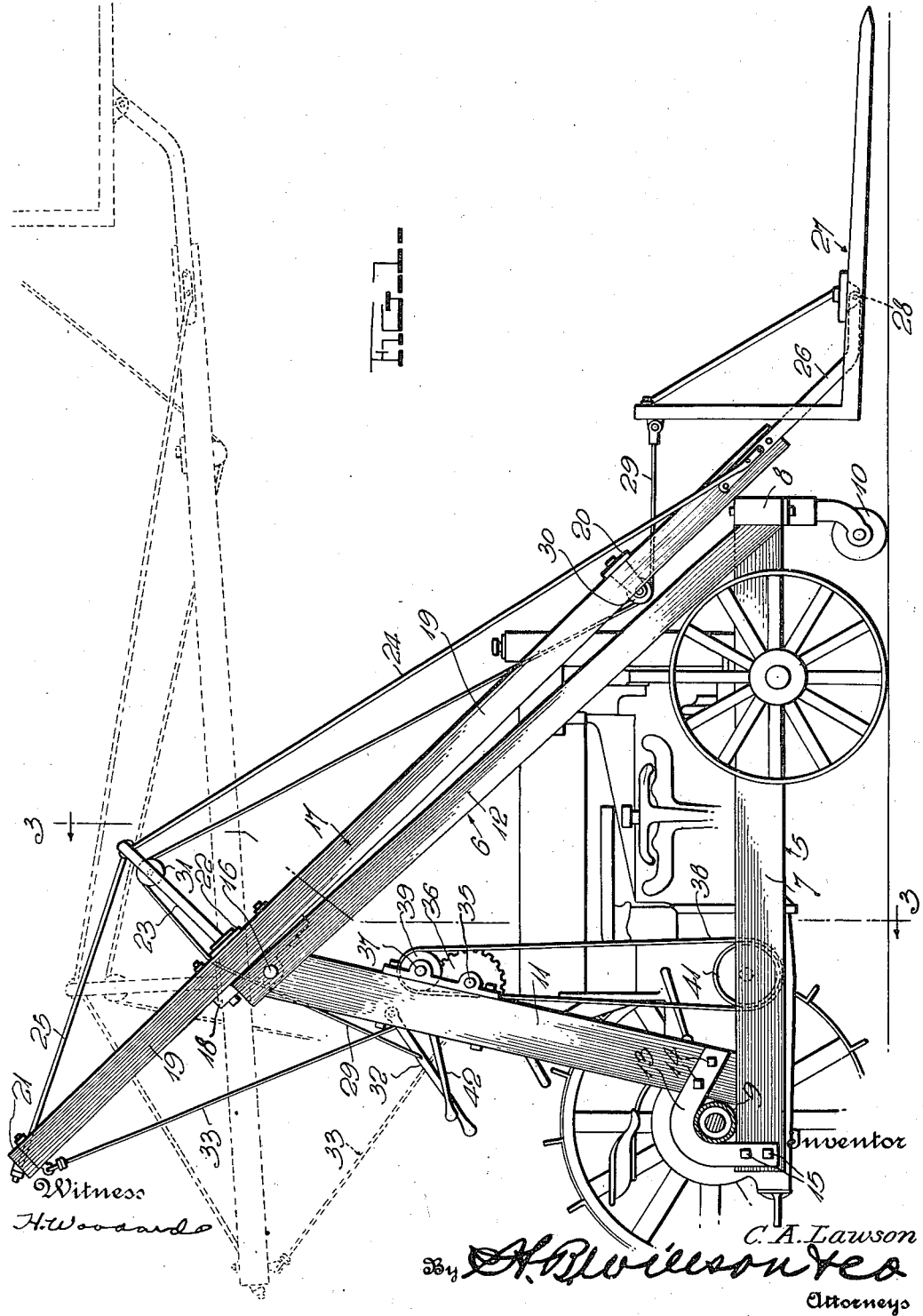
Witness  
H. Woodard
Inventor  
C. A. Lawson  
By  
Attorneys

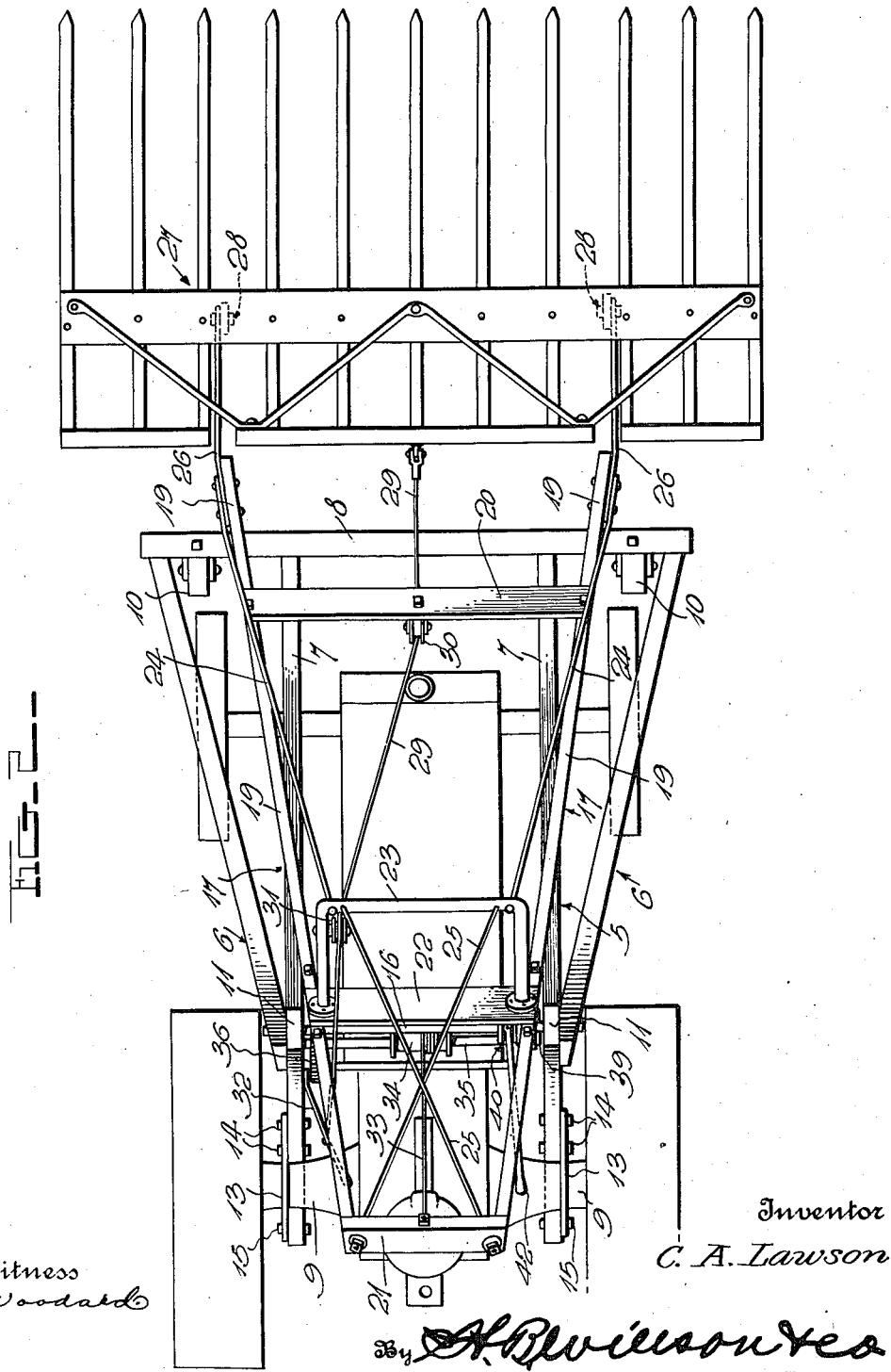

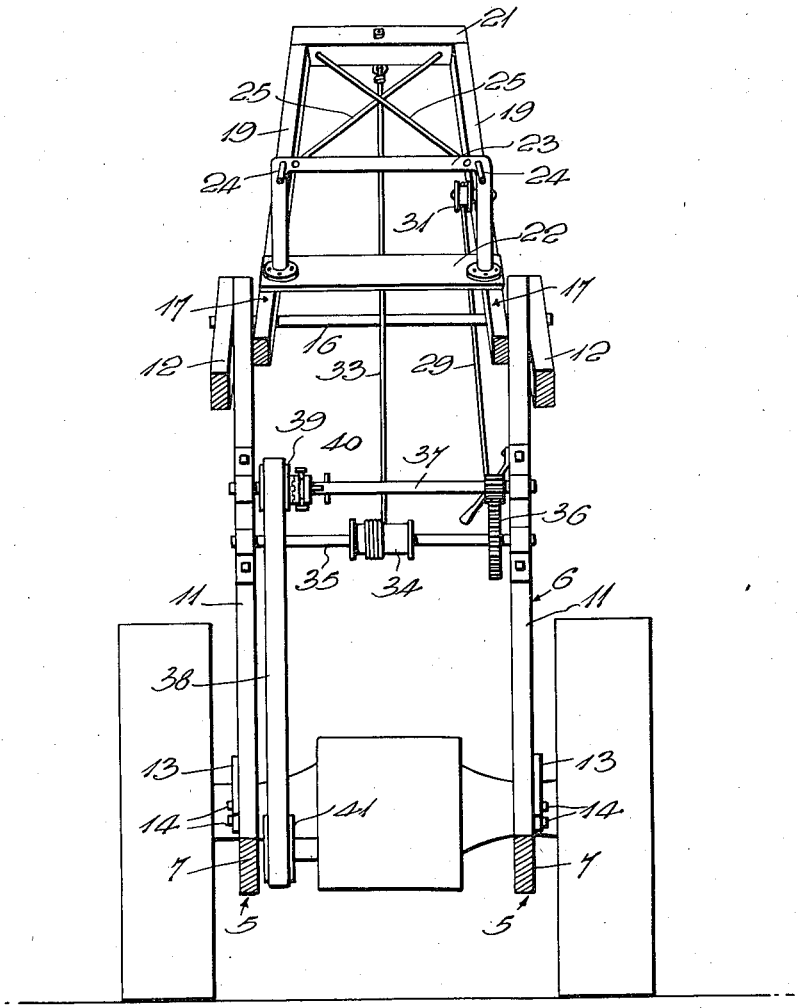

Patented Nov. 9, 1926.

1,606,251

UNITED STATES PATENT OFFICE.

CHESTER A. LAWSON, OF EMPORIA, KANSAS.

HAY RAKE AND STACKER ATTACHMENT FOR TRACTORS.

Application filed April 5, 1926. Serial No. 99,969.

The invention aims to provide a rather simple and inexpensive, yet efficient, desirable and easily operable attachment for an ordinary tractor, capable of gathering hay in the same manner as an ordinary sweep, carrying it to a desired point, and stacking it at said point, provision being made whereby the attachment may be quickly and easily attached to or detached from the tractor.

With the foregoing in view, the invention resides in the novel subject matter hereinafter described and claimed, the description being supplemented by the accompanying drawings.

Figure 1 is a side elevation showing the application of the invention to a tractor, the rear axle of the latter being shown in vertical section.

Figure 2 is a top plan view.

Figure 3 is a vertical transverse section taken substantially on line 3—3 of Figure 1.

In the drawings above briefly described, the numeral 5 designates a base frame while the numerals 6 have reference to a pair of inverted V-shaped side frames which are secured to and rise from said base frame. The frame 5 preferably comprises a pair of longitudinal side bars 7 rigidly connected at their front ends by a transverse bar 8 which projects laterally beyond them, the rear end of said side bars being adapted to underlie and contact with the rear axle 9 of a tractor, while said bar 8 is then disposed in front of said tractor. This bar 8 or some other front portion of the frame 5, is provided with caster wheels 10 to run upon the ground and support said front end of the frame. Each side frame comprises a substantially upright standard 11 secured to and rising rigidly from the side bar 7, and a forwardly declined bar 12, the upper end of this bar being secured to a standard 11, while its lower end is suitably secured to the laterally projecting end of the bar 8. Each standard 11 has its lower end spaced forwardly from the rear extremity of the side bar 7 to abut the front side of the axle 9 and to secure the frame structure to said axle, an arched yoke 13 is provided at each side of said structure. Each of these yokes extends over the axle 9, has one of its ends secured by bolts or the like 14 to a standard 11, and is similarly secured at its other end to the side bar 7, by bolts or other suitable fasteners 15. It will be seen that the yokes 13, the lower portions of the standards 11, and the rearwardly projecting ends of the two side bars 7 jointly surround the end portions of the axle 9, so that the frame structure is effectively connected with the tractor and held against movement with respect thereto, in all directions.

The upper ends of the standards 11 and the bars 12 carry a transverse horizontal shaft 16 upon which a rake-carrying frame 17 is pivotally mounted in any desired manner, said frame preferably having bearings 18 through which the shaft passes. This frame 17 preferably includes a pair of longitudinal side bars 19, and front, rear and intermediate transverse bars 20, 21 and 22 rigidly connecting side bars. In the present showing, an arched frame 23 is secured to and rises from the transverse bar 22. Truss rods 24 extend from this frame to the front end of the frame 17, and rear truss rods 25 which are preferably crossed, extend to the rear end of said frame 17 from the frame 23. At its front end, frame 17 is provided with forwardly projecting arms 26 to which an appropriately constructed rake 27 is pivoted at 28. To normally hold this rake against pivotal movement, a cable 29 is connected to it; said cable being engaged with a sheave 30 carried by the bar 20 and with another sheave 31 on the frame 23, and extending downwardly from this sheave to a suitable lever or the like 32 within reach of the operator. Any means may be provided for holding this lever in adjusted position and it will be seen that by proper manipulation of said lever, the rake 27 may be maintained at a horizontal position while the frame 17 is raising it, as shown for instance in dotted lines in Figure 1. Then at the proper time, the lever may be released to permit dumping of the rake and the load elevated thereby.

For swinging the frame 17 about its pivotal mounting means to raise and lower the fork, a cable 33 has been shown suitably connected with the rear end of said frame, said cable being wound around a drum 34 on a transverse shaft 35 which is mounted in appropriate bearings carried by the standards 11. This shaft is connected by appropriate gearing 36 with another shaft 37 which is also mounted in bearings carried by the standards 11. By means of a belt 38, a pulley 39 and a clutch 40, shaft 37 may be driven from the usual power take off pulley 41 of the tractor, and for controlling the clutch 40, lever 42 has been indicated. If desired, this lever could also control a suitable brake (not shown), or a brake of adequate form could be provided, to be controlled in some other way to permit lowering of the frame 17 at a sufficiently slow speed to prevent injury to any parts, it being of course understood that when the clutch 40 is thrown into play, shaft 37, gearing 36 and shaft 35, drive the drum 34, thus winding the cable 30, pulling downwardly upon the rear end of the frame 17 and swinging the front end of this frame upwardly.

Excellent results may be obtained from the general construction shown and described. It may therefore be followed if desired. However, within the scope of the invention as claimed, variations may of course be made.

I claim:—

1. In a hoisting attachment for a tractor, a base frame having side bars whose rear ends are adapted to underlie and contact with the rear axle of the tractor, means for supporting the front end of said base frame, standards rising from said side bars and spaced forwardly from their rear extremities to abut the front side of the axle, and means for releasably holding said side bars and standards in engagement with the axle.

2. In a hoisting attachment for a tractor, a base frame having side bars whose rear ends are adapted to underlie and contact with the rear axle of the tractor, means for supporting the front end of said base frame, standards rising from said side bars and spaced forwardly from their rear extremities to abut the front side of the axle, arched yokes to extend over the axle, and releasable means for securing the ends of said yokes to said standards and side bars respectively.

3. A tractor attachment comprising a base frame having longitudinal side bars connected at their front ends by a transverse bar which projects laterally from said side bars, caster wheels for supporting the front end of said base frame, means for connecting the rear end of said side bars to the rear axle of the tractor, standards rising rigidly from said side bars, additional bars declining from the upper ends of said standards to the ends of said transverse bar, a transverse shaft jointly supported by said declined bars and said standards, a rake-carrying frame pivotally supported near its rear end upon said transverse shaft, means connected with the rear end of said rake-carrying frame for swinging the same, including a drum shaft extending between and rotatably supported by said standards, a rake pivotally mounted at the front end of said rake carrying frame, and means for controlling the movement of the rake about its pivotal mounting means.

4. A tractor attachment comprising a base frame having longitudinal side bars connected at their front ends by a transverse bar which projects laterally beyond said side bars, means for supporting the front end of said base frame, means for connecting the rear end of said side bars to the rear axle of the tractor, standards rising rigidly from said side bars, additional bars declining from the upper ends of said standards to the ends of said transverse bar, a transverse shaft supported jointly by said declined bars and said standards, a rake-carrying frame pivotally supported near its rear end upon said transverse shaft, means connected with the rear end of said rake-carrying frame for swinging the same, a rake pivotally mounted at the front end of said rake carrying frame, and means for controlling the movement of the rake about its pivotal mounting means.

In testimony whereof I have hereunto affixed my signature.

CHESTER A. LAWSON.